United States Patent
Eis

[19]

[11] Patent Number: 6,151,874

[45] Date of Patent: Nov. 28, 2000

[54] ADJUSTMENT DEVICE FOR HYDRAULIC CYLINDERS

[75] Inventor: Günter Eis, Harsewinkel, Germany

[73] Assignee: Class KGaA, Harsewinkel, Germany

[21] Appl. No.: 09/304,923

[22] Filed: May 4, 1999

[30] Foreign Application Priority Data

May 13, 1998 [DE] Germany .......................... 198 23 347

[51] Int. Cl.[7] .................................................. A01B 63/00
[52] U.S. Cl. ............................... 56/10.2 E; 172/4; 172/7; 56/DIG. 11; 60/413
[58] Field of Search ................................. 172/2, 3, 4, 4.5, 172/7; 56/10.2 E, DIG. 11; 60/413, 468, 469; 91/437

[56] References Cited

U.S. PATENT DOCUMENTS

| | | | |
|---|---|---|---|
| 3,908,345 | 9/1975 | Oni et al. .................................. | 56/208 |
| 4,648,466 | 3/1987 | Baker et al. ......................... | 172/260.5 |
| 4,733,523 | 3/1988 | Dedeyne et al. ......................... | 56/10.2 |
| 4,969,562 | 11/1990 | Saotome .................................... | 60/413 |
| 5,333,533 | 8/1994 | Hosseini .................................... | 91/361 |
| 5,339,611 | 8/1994 | Roderfeld et al. . | |
| 5,419,401 | 5/1995 | Castagno .................................... | 172/4 |
| 5,562,165 | 10/1996 | Janelle et al. ............................. | 172/4 |
| 5,577,373 | 11/1996 | Panoushek et al. ................ | 56/10.2 E |
| 5,613,352 | 3/1997 | Panoushek et al. ................ | 56/10.2 E |
| 5,718,115 | 2/1998 | Burkner .................................... | 60/413 |
| 5,733,095 | 3/1998 | Palmer et al. ............................. | 60/413 |
| 5,802,847 | 9/1998 | Harnischfeger .......................... | 60/413 |
| 5,992,146 | 11/1999 | Hausman .................................. | 60/413 |

FOREIGN PATENT DOCUMENTS

| | | |
|---|---|---|
| 0 610 900 A1 | 2/1994 | European Pat. Off. . |
| 1 092 778 | 11/1960 | Germany . |
| 1 480 154 | 5/1965 | Germany . |
| 2 407 970 | 9/1974 | Germany . |
| 28 11 873 C2 | 9/1979 | Germany . |
| 33 37 789 A1 | 4/1984 | Germany . |
| 36 28 427 C2 | 2/1988 | Germany . |

*Primary Examiner*—Thomas B. Will
*Assistant Examiner*—Nathan Mammen
*Attorney, Agent, or Firm*—Husch & Eppenberger, LLC; Robert E. Muir

[57] ABSTRACT

A device for the control and adjustment of hydraulic cylinders on work attachments and assemblies of work machines, preferably self-propelled harvesting machines. Increasing the performance of harvesting machines for bringing in crops efficiently and without loss requires rapid, uncomplicated adaptation of the harvesting machines and front harvesting attachments to the respective load and operating conditions. The front harvesting attachments and wheel carriages are connected to the hydraulic circuit of the harvesting machine and driven automatically by means of the electronic control system as a function of the respective working and operating conditions.

4 Claims, 4 Drawing Sheets

ADJUSTMENT DEVICE FOR HYDRAULIC CYLINDERS

BACKGROUND OF THE INVENTION

The invention relates generally to the field of agricultural machines and, more particularly, concerns a device for the adjustment and control of hydraulic cylinders on front attachments and assemblies of work machines such as self-propelled agricultural machines.

The use of hydraulic or pneumatic work cylinders on machines and devices for producing a rectilinear movement is already generally known. By means of these linear motors very high speed reductions and considerable lifting or adjusting forces can be achieved.

For example DE 36 28 472 C2 shows a work machine with a work attachment of adjustable height which is removably coupled to the work machine using a hydraulic cylinder. By means of the hydraulic cylinder the weight of the work attachment is transmitted to the work machine and at the same time the implement is moved to the desired working position. It is the aim of this patent to reduce the digging and bearing forces of the work attachment as a function of the conditions of use and the presetable values for the bearing or load relief pressure. On the circuitry side the work cylinders are connected by a 3/2-port directional control valve to a hydraulic pump, wherein in the pressure line between the directional control valve and the hydraulic cylinder is located a pressure sensor which is connected by a control line to a pressure control circuit with a setpoint generator. By a further control line the pressure control circuit is connected to a regulating valve which is arranged in a bypass line connecting the pressure line to the return line. By means of this circuit arrangement the actual pressure value prevailing in the hydraulic cylinder can be regulated to reduce the bearing forces of the front work attachment or the load relief pressure can be regulated in case of deviations from a nominal pressure value set in the control device.

An advantageous development of this type of control system is the subject of EP 0 610 900 A1. To improve the prior-art load relief device, a rechargeable pressure storage device with a switching valve in front is connected to the pressure chamber of the piston face of the hydraulic cylinder and a further switching valve is provided between the pressure and return lines for the hydraulic fluid. By means of this switching valve assembly, after reaching the pressure necessary for the load relief mode in the pressure chamber of the hydraulic cylinder and in the rechargeable pressure storage device, the hydraulic circuit on the motor vehicle side can be separated from the load relief circuit, the pressure storage device remaining connected to the pressure chamber of the hydraulic cylinder for maintaining the load relief mode. In case of variations in load relief pressure which are above or below the set nominal value, the line connection of the pressure chamber of the hydraulic cylinder and of the pressure storage device to the pressure or return line is made automatically by the switching valve assembly.

A hydraulic floating assembly for an agricultural implement is known from DE 33 37 789 A1. According to this patent publication the pressure chambers of the hydraulic cylinders are connected by a directional control valve to a hydraulic pump, and in the branch of the high-pressure line between the directional control valve and the pressure chambers of the hydraulic cylinders is inserted a pressure storage device with a further cylinder in front having a floating piston. With this hydraulic floating assembly, front harvesting or work attachments on self-propelled machines are kept at a yielding pretensioning force which is adjustable as a function of their weight in such a way that they can glide over the ground and on encountering an obstacle are lifted, assisted by the pressure forces existing in the pressure storage device.

For the resilient suspension of vehicle axles with damped vibrations, from vehicle construction are non-analogous solutions in which the load-bearing vehicle axles are arranged in a pivotably mounted wishbone provided directly on the vehicle frame (e.g. DE 14 80 154; DE 24 07 970; and DE 28 11 873) or in a rocker arm which is linked to a longitudinal member mounted at the end on the vehicle frame (e.g. DE 10 92 778). The wishbones mounted directly on the vehicle frame or the longitudinal member mounted on the vehicle frame are connected to a hydraulic or pneumatic cylinder. Due to the rotatable arrangement of wishbone and longitudinal member and their cooperation with a pneumatic gas strut or a pneumatic/hydraulic cylinder, the vibrations and impacts which arise during automotive operation and are transmitted from the wheel carriage to the whole vehicle are largely compensated or damped and, with improved ground adhesion of the vehicle wheels, good adaptation of the wheel carriage to the road or highway is achieved.

The application or direct transfer of these basic solutions is not possible for reasons discussed below.

Depending on the crop, self-propelled harvesting machines are equipped with different front harvesting attachments. Inevitably there are great differences in weight between these different front harvesting attachments. For lifting and lowering the different front harvesting attachments and for producing an adjustable yielding pretensioning force in the lifting and adjusting cylinders for maintaining a floating arrangement of the implements during the harvesting operation, relatively extensive equipment must be provided on the hydraulic side.

Particularly extreme are the differences in weight with the front harvesting attachments for self-propelled forage harvesters. For the front harvesting attachments which are used for example for harvesting grass with a pick-up, working pressures of approximately 40 bars are necessary, while in corn harvesting with a front corn harvesting attachment pressures of up to 130 bars must be applied. For the connection of front harvesting attachments with a relatively high weight to self-propelled harvesting machines, there are provided cylinders in addition to the already existing hydraulic lifting and adjusting cylinders. These additional cylinders are dismantled again for operations with front harvesting attachments having a relatively low weight.

The different load states of a harvesting machine also include the degree of loading, the field condition and the function, which require differentiated adjustment of the front harvesting attachments and wheel carriages by altered, differing work pressures in the hydraulic cylinders. This is to ensure trouble-free operation with a high assurance of control, a high machine output and very low harvesting losses. Thus greatly varying axle loads have to be taken up and transmitted to the road or path from the wheel carriage when travelling empty with a front harvesting attachment hooked on, as opposed to when travelling with a fully loaded grain bin.

Inevitably a change in travelling state occurs with harvesting processes on more or less level field surfaces as opposed to harvesting of crops on slopes. For example, the left and right wheel carriages of the machine is subjected to different loads under these different field conditions.

By contrast when working with a front harvesting attachment mounted permanently on the harvesting machine, the spring travel of the wheel carriage must be as short as possible or completely blocked.

With the devices known from the state of the art and mentioned above, however, the problems arising from the varying operating and working conditions of self-propelled harvesting machines cannot be solved.

It is therefore an object of the present invention to overcome one or more of the difficulties described above.

It is another object to develop a device which, with automatic regulation of the chosen setting by an electronic machine control system, allows adjustment and control of the work cylinders provided on front work attachments and machine assemblies as a function of the constantly changing, different states of loading and operation.

SUMMARY OF THE INVENTION

In accordance with the present invention there is provided a device for the adjustment and control of hydraulic cylinders of front work attachments and assemblies on work machines such as self-propelled harvesting machines, having means for providing central hydraulics, a hydraulic cylinder with at least one piston face pressure chamber, at least one directional control valve connected to the pressure chamber and the central hydraulics, at least one rechargeable pressure storage device, a shut-off valve associated with the pressure storage device, means connecting the pressure chamber and the pressure storage device in parallel, a hydraulic control circuit for driving each directional control valve and each shut-off valve, the hydraulic control circuit being connected to a setpoint input, means for automatically making a line connection to a pressure line and a return line of the central hydraulics when pressure differs from predetermined nominal work pressure values, a position sensor operatively connected to the hydraulic cylinder, and an electronic control system for monitoring and detecting the position of the work piston.

Advantageously the hydraulic cylinders are double-acting hydraulic cylinders with single-acting piston rod, whose pressure chambers can be switched differently by directional control valves and by these directional control valves connected to the central hydraulics of the harvesting machine. The hydraulic cylinders are further directly connected in parallel with pressure storage devices in front of which is a shut-off valve.

By means of the directional control valves the double-acting work cylinders are switched in such a way that the piston face pressure chamber which is designed for taking up and transmitting maximum inertia forces, and in this case the piston face acts as the working face while the pressure chamber of the piston rod face is ventilated to the work fluid tank, is connected to the piston rod pressure chamber and operation is performed only with the piston rod face as the active work face to take up and transmit relatively smaller inertia forces.

Consequently during operation of the harvesting machine when working with relatively low loads, for example when travelling empty with the front harvesting attachment removed, operation is performed with the piston rod face, whereas in operating states with higher loads, for example in the harvesting process with the front harvesting attachment attached, operation is performed with the piston face of the double-acting hydraulic cylinders for adjustment of the wheel carriage. In this case the piston rod pressure chamber is connected to the tank of the central hydraulics. The ratio of piston rod face to piston face here roughly corresponds to the axle load with and without front harvesting attachment attached, wherein by switching at lower loads to the piston rod pressure chamber and at high loads to the piston face pressure chamber, the work pressure in both operating states can be kept at approximately the same level and the pressure storage devices and valves can be optimized to this operating point.

The piston rod pressure chamber of the double-acting hydraulic cylinders according to another feature is directly connected to further pressure storage devices by means of which, for example after adjustment of the wheel carriage and shutting off the piston rod pressure chamber from the central hydraulics, the differences in volume which are equalized by the piston movements as a result of vibrations and impacts which are to be taken up by the wheel carriage during operation. The pressure in the storage devices here simulates an artificial axle load.

Thus the hydraulic cylinders which are provided as adjusting and damping cylinders for the wheel carriage can also be adjusted and controlled individually, in order to compensate for the loads on the harvesting machine caused by the slope. The tilt of the harvesting machine can here be influenced to a minor extent.

The adjusting members of the directional control, switching and shut-off valves are connected to the electronic control system of the harvesting machine, to which is connected on the input side a strategy preselector for the load states to be expected and direction pickups. The direction pickups are, for example, associated with the hydraulic adjusting and damping cylinders of the left and right wheel carriages and serve to monitor the position of the work piston. By comparison of nominal and actual values in the electronic machine control system, checking and regulation of the wheel carriage setting is relatively easy with the aid of the nominal values entered in the strategy preselector.

According to the predetermined values the work cylinders and the pressure storage devices are subjected to a working pressure via the directional control valves which are driven by the central machine control system, until the actual value detected by the direction pickups tallies with the predetermined nominal value. This nominal value is approximately in the middle of the work piston stroke. Then the control system shuts off the directional control valves and separates the pressure chambers of the hydraulic cylinders and the pressure storage devices from the central hydraulics of the harvesting machine, the pressure storage devices being further connected to the pressure chambers of the work cylinders. During travel or during the harvesting process the piston of the work cylinders can move in and out, the differences in volume arising being equalized by the pressure storage devices. The work pressure prevailing in the adjusting and damping cylinders corresponds to a value which is analogous to the respective axle load.

Advantageously, associated with the adjusting and damping cylinders can be further pressure storage devices which are prestressed at different pressures. In this way it is possible to bridge great differences in pressure which arise, for example, between travelling empty with the front harvesting attachment hooked up and when working with the front harvesting attachment mounted and with a full grain bin.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
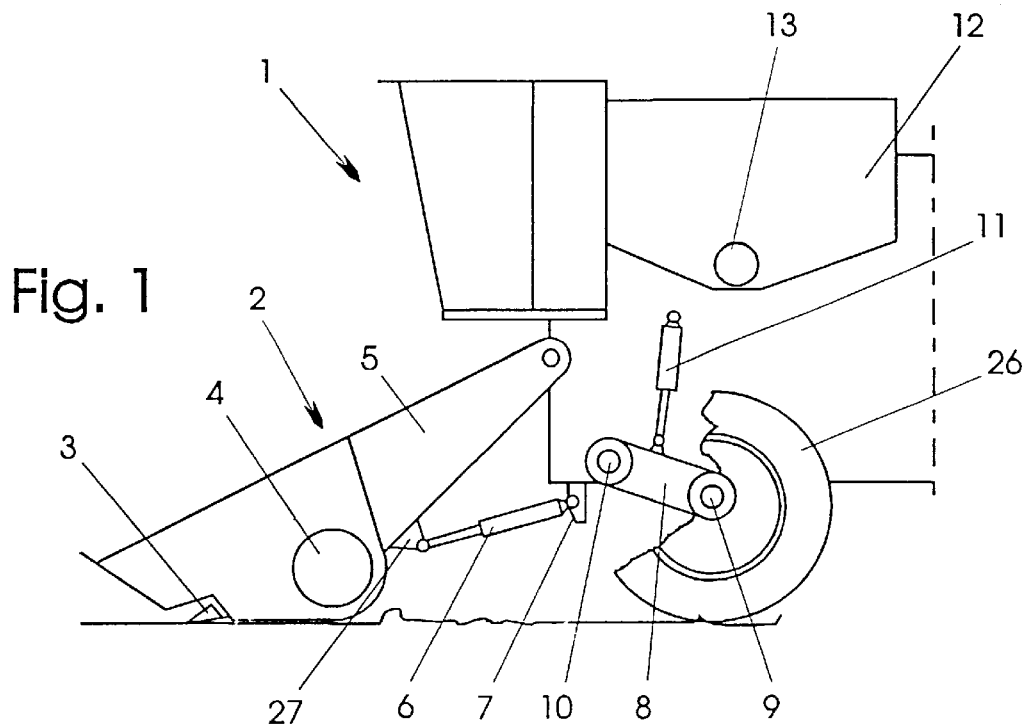
FIG. 1 is a side view of the front part of a combine shown schematically with a front harvesting attachment adjustable by work cylinders and with a front wheel carriage.

The front part of a combine harvester I shown schematically in FIG. 1, with a grain bin 12 and grain bin unloading auger 13, has a damped, sprung front wheel carriage and a front harvesting attachment 2, of which only the cutterbar 3, the header auger 4 with pick-up and the feed rake 5 for introducing the crop into the harvesting machine are shown schematically. The front harvesting attachment 2 is connected to the combine harvester I so as to allow adjustment in the spatial axes x, y and z in a manner known in the art using hydraulic lifting cylinders, not shown. To adjust and maintain the working position in which the cutterbar 3 glides over the field surface at as short a distance as possible during the harvesting process and is lifted on encountering an obstacle, apart from the hydraulic lifting cylinders the hydraulic cylinder 6 serves to couple the front harvesting attachment 2 to the combine harvester 1. The piston rod of the hydraulic cylinder 6 is buffered against the front harvesting attachment 2 at 27 and rigidly connected to the machine frame of the combine harvester 1 by an attaching block 7.

The wheel axle 9 for the front wheel 26 of the wheel carriage is mounted in a rocker arm 8 which is linked to the machine frame so as to be pivotable about the pivot point 10. Within its pivot range which is bounded by end stops, the rocker arm 8 is supported by a work cylinder 11 which may be a hydraulic cylinder. Work cylinder 11 serves as an adjusting and damping cylinder and is linked to the rocker arm 8 and to the combine harvester structure. Depending on the respective load and operating states of the harvesting machine, the wheel carriage is preset by means of the work cylinder 11 and the vibrations arising in the harvesting mode and during road transport are damped and cushioned. The work cylinder 11 is, like the hydraulic cylinder 6, connected on the circuitry side, as described in more detail below with the aid of FIGS. 3 to 5, to the hydraulic circuit of the central hydraulics 40 of the combine harvester 1.

Figure 2:
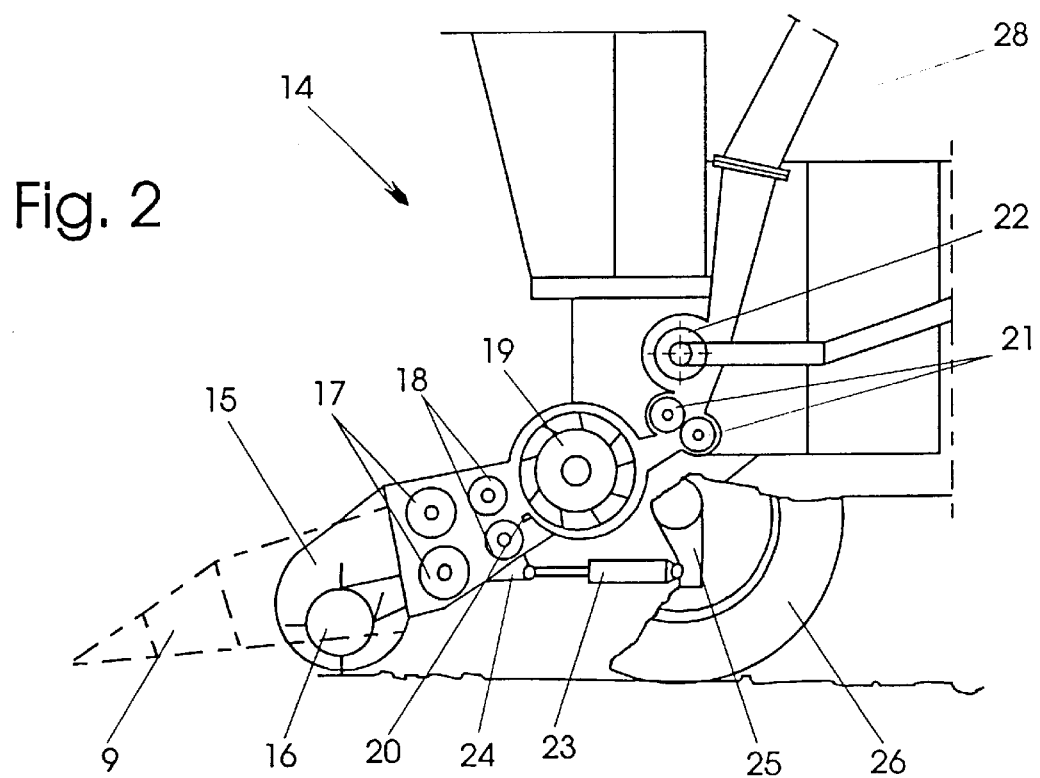
FIG. 2 is a side view of the front part of a self-propelled forage harvester which is equipped with an adjustable pick-up or, alternately, with a front corn harvesting attachment shown in phantom lines.

The front part of a self-propelled forage harvester 14, shown schematically in FIG. 2, is equipped with a front harvesting attachment 15 consisting of a pick-up 16 adjoined by the feed rollers 17 and the compression rollers 18. Depending on the crop to be harvested, the forage harvester 14 can also be equipped with a front harvesting attachment 9 for harvesting corn. The crop picked up by the pick-up is passed over the feed and compression rollers to a cutting cylinder 19 which comminutes the crop in cooperation with the shear bar 20. The comminuted crop is, if occasion arises, further treated by the cracker rollers 21 and, assisted by the postaccelerator 22, removed via the discharge 28.

A hydraulic cylinder 23 serves to adjust and maintain the working positions of the front harvesting attachment 9, 15. The piston rod of the hydraulic cylinder 23 is buffered against the front harvesting attachment 9, 15 at 24 and rigidly connected to the machine frame of the forage harvester 14 by means of the attaching block 25. As described in more detail below with the aid of FIGS. 4 and 5, the hydraulic cylinder is connected on the circuitry side to the circuit of the central hydraulics of the forage harvester 14 and can be driven by the electronic machine control system.

Figure 3:
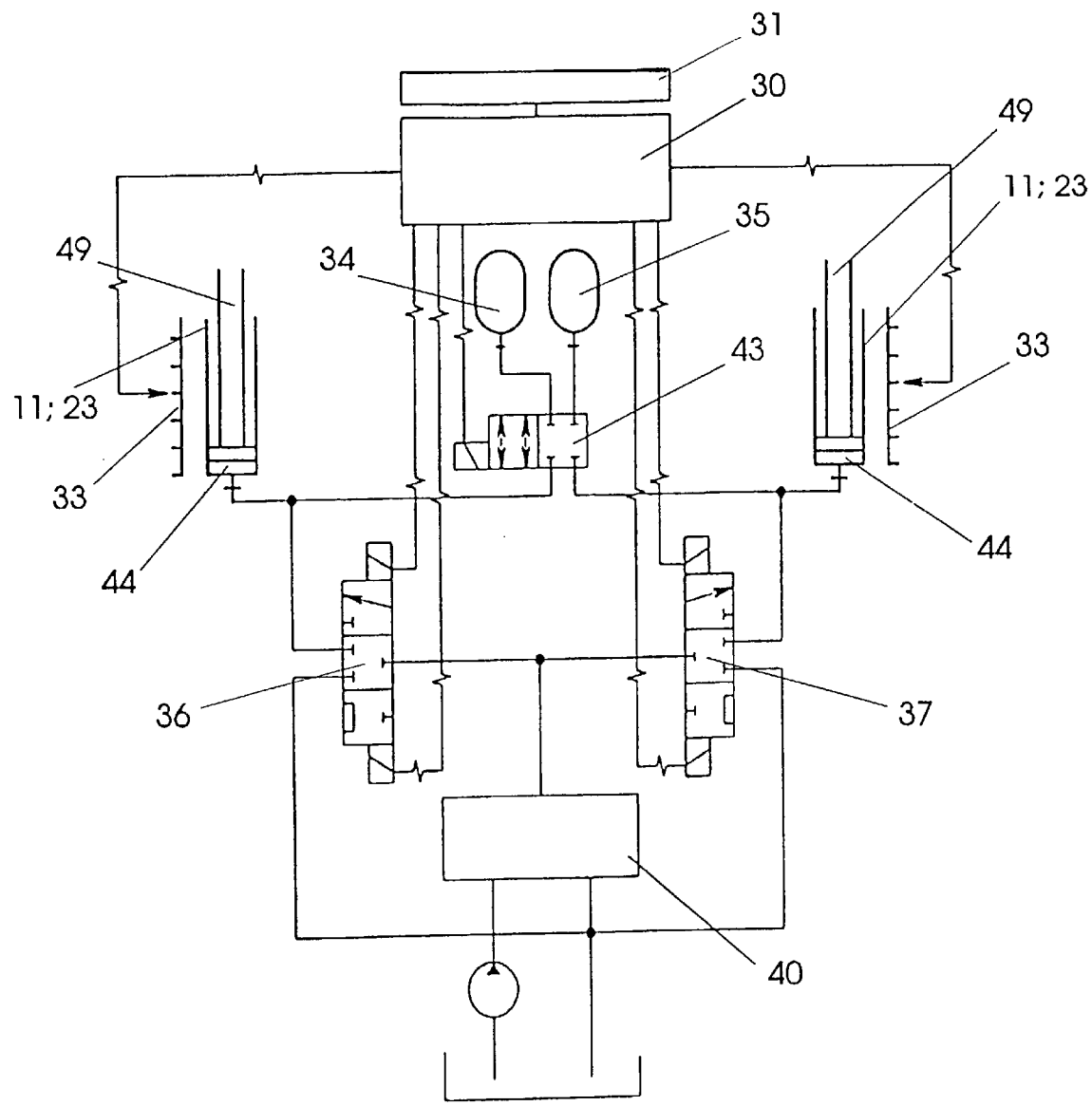
FIG. 3 is a diagrammatic view a first embodiment for the adjustment and control of hydraulic cylinders as a function of the load states of the harvesting machine.

In FIG. 3 the work cylinder 11 associated with the left and right wheel carriages, with which adjustment of the wheel carriage in relation to the load states and adaptation of the wheel carriage to different operating conditions can be performed, is according to an advantageous variant a single-acting hydraulic cylinder which is connected by directional control valves 36, 37 to the central hydraulics 40 of the harvesting machine.

Connected in parallel with the work cylinders 11 are pressure storage devices 34, 35 in front of which is a shut-off valve 43. The pressure storage devices or accumulators 34, 35 serve to equalize differences in volume which are caused by the piston movements of the work piston 49 during cushioning and damping of the shocks arising during machine and automotive operation, after the wheel carriage has been adjusted according to the load states to be expected by means of the work cylinder 11 and the line connection of the piston face pressure chamber 44 to the central hydraulics 40 has been cut off by switching the directional control valves 36, 37 by means of the electronic control system 30.

The adjusting members of the directional control valves 36, 37 and of the shut-off valve 43 are connected on the control side to the electronic control system 30 of the harvesting machine, wherein connected to the input of the control system 30 is a strategy preselector 31 for presetting the work piston 49 of the work cylinder 11 as a function of the load states to be expected and the position of the direction pickup 33, which presetting can be performed by the operator. The direction pickups 33 are associated with the work cylinders 11 and detect the piston position of the work piston 49. Deviations from the set nominal value, which roughly corresponds to the middle position of the work piston 49, are signaled to the electronic control system 30 and trigger actuation of the adjusting members of the directional control valves 36, 37, in order to move the work piston 49 in or out by varying the working pressure in the piston face pressure chamber 44. The working pressure here corresponds to a value which is analogous to the axle load.

On slopes the tilt of the machine can be corrected within narrow limits by setting the left and right wheel carriages to different heights by means of the work cylinder 11.

On entering "suspension and unladen machine", the control system 30 actuates the directional control valves 36, 37 and the shut-off valve 43 and connects the piston face pressure chamber 44 of the work cylinder 11 and the pressure storage devices 34, 35 to the central hydraulics 40 of the harvesting machine. The work pistons 49 are extended until the direction pickups 33 signal a piston position which corresponds to the nominal value set at the strategy preselector 31. This value, as stated above, is approximately halfway along the stroke of the work piston 49. Then the control system 30 shuts off the directional control valves 36, 37 and the shut-off valve 43 from the line connection to the central hydraulics 40. During the subsequent working mode of the harvesting machine the work piston 49 of the work cylinder 11 can move in and out, the volume differences triggered thereby in the piston face pressure chamber 44 being equalized by the pressure storage devices 34,35.

If the front harvesting attachment 2 is mounted and lifted, there is an increase in the axle load and hence the pressure in the piston face pressure chamber 44. The work piston 49 moves in and displaces the work fluid into the pressure storage devices 34, 35. The control system 30 detects via the direction pickups 33 the deviations from the nominal value and switches the directional control valves 36, 37, as a result of which the pressure chambers 44 are connected to the central hydraulics 40. The pressure chambers 44 are again subjected to the pressure of the work fluid and the work piston 49 is moved out until the direction pickups 33 signal the position of the work piston 49 which corresponds to the predetermined nominal value. Then the directional control valves 36, 37 are again shut off by the control system 30, and the pressure chambers 44 of the work cylinders 11 are directly connected to the pressure storage devices 34, 35 in order to absorb and damp the vibrations and impacts arising during operation. The same procedure occurs when during the working process the grain bin 12 gradually fills up and the axle load steadily increases.

With emptying of the grain bin 12 the machine weight decreases, the pressure in the pressure chambers 44 drops and the work piston 49 moves out, the missing volume of work fluid being topped up by the pressure storage devices 34, 35. The deviation of the work piston 49 from its nominal position is again detected by the direction pickups 33 and signaled to the control system 30. The control system switches the directional control valves 36, 37 in such a way that the pressure of the work fluid in the pressure chambers 44 of the work cylinders 11 is reduced and the work piston 49 moves in until the direction pickups 33 signal a piston position which corresponds to the desired nominal value. This procedure is repeated if for example the front harvesting attachment 2 is dismounted and the axle load of the harvesting machine further decreases.

According to an advantageous embodiment the cylinders 6, 11 and 23 are double-acting hydraulic cylinders. This embodiment has the advantage that in case of low load forces, operation can be performed with the piston rod pressure chamber 45, and in case of higher load forces which require a higher working pressure, operation can be performed with the piston face pressure chamber 44 of the double-acting work cylinders. The ratio of piston rod face and piston face here corresponds to the load states of the harvesting machine with and without the front harvesting attachment 2, 9 and 15. With high load states operation is then performed with the piston face and, during machine operation without the front harvesting attachment mounted, with the piston rod face.

Figure 4:
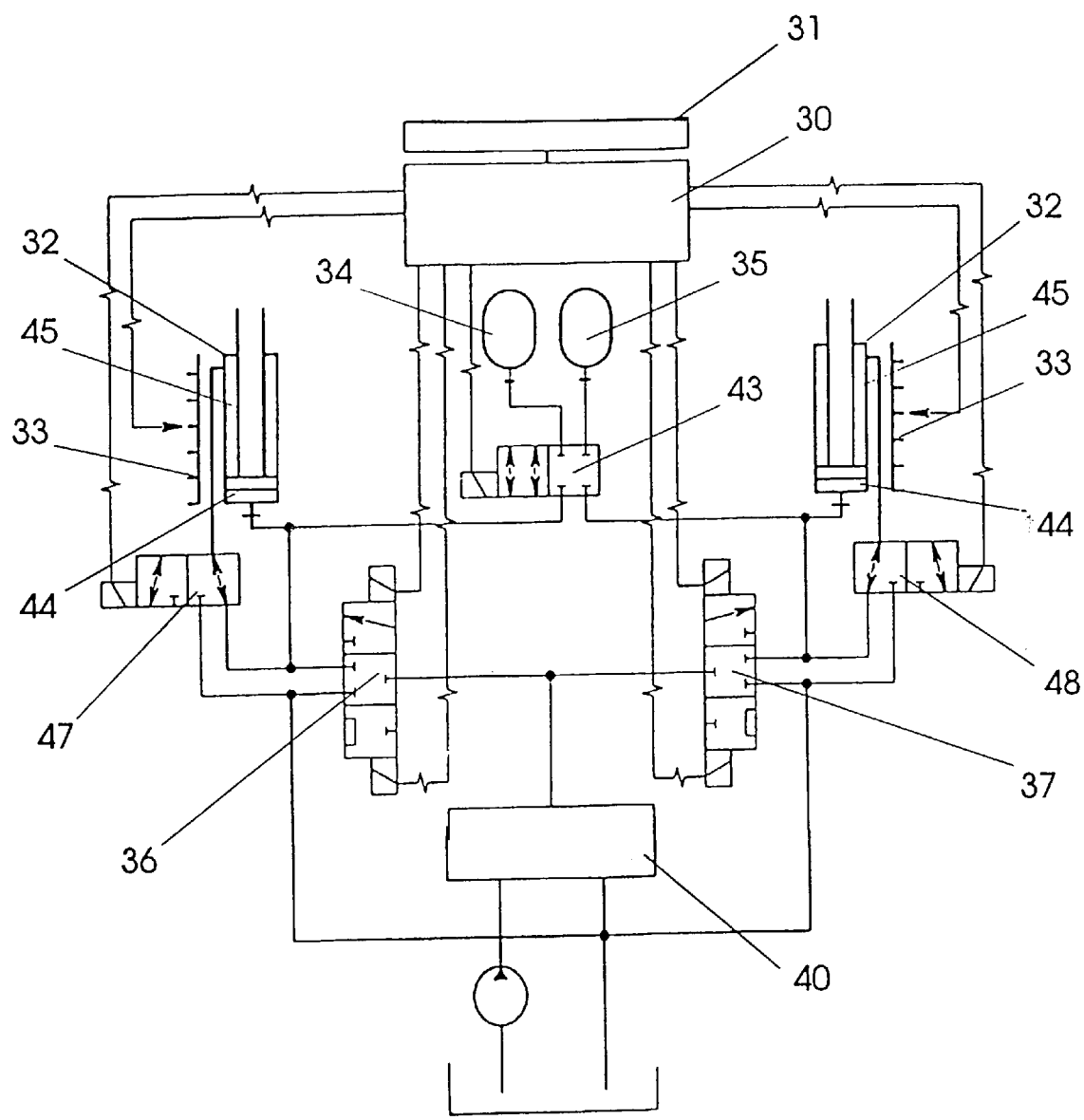
FIG. 4 is a diagrammatic view of an embodiment similar to FIG. 3 but showing the use of double-acting hydraulic cylinders with single-acting piston rods.

The circuitry is shown in FIG. 4. The pressure chambers 45 of the piston rod face are connected by drivable switching valves 47, 48 selectively to the pressure chamber 44 of the piston face, the pressure storage devices 34 and 35 and/or the tank line of the central hydraulics 40, and by the directional control valve 36, 37 to the central hydraulics 40 of the harvesting machine.

Figure 5:
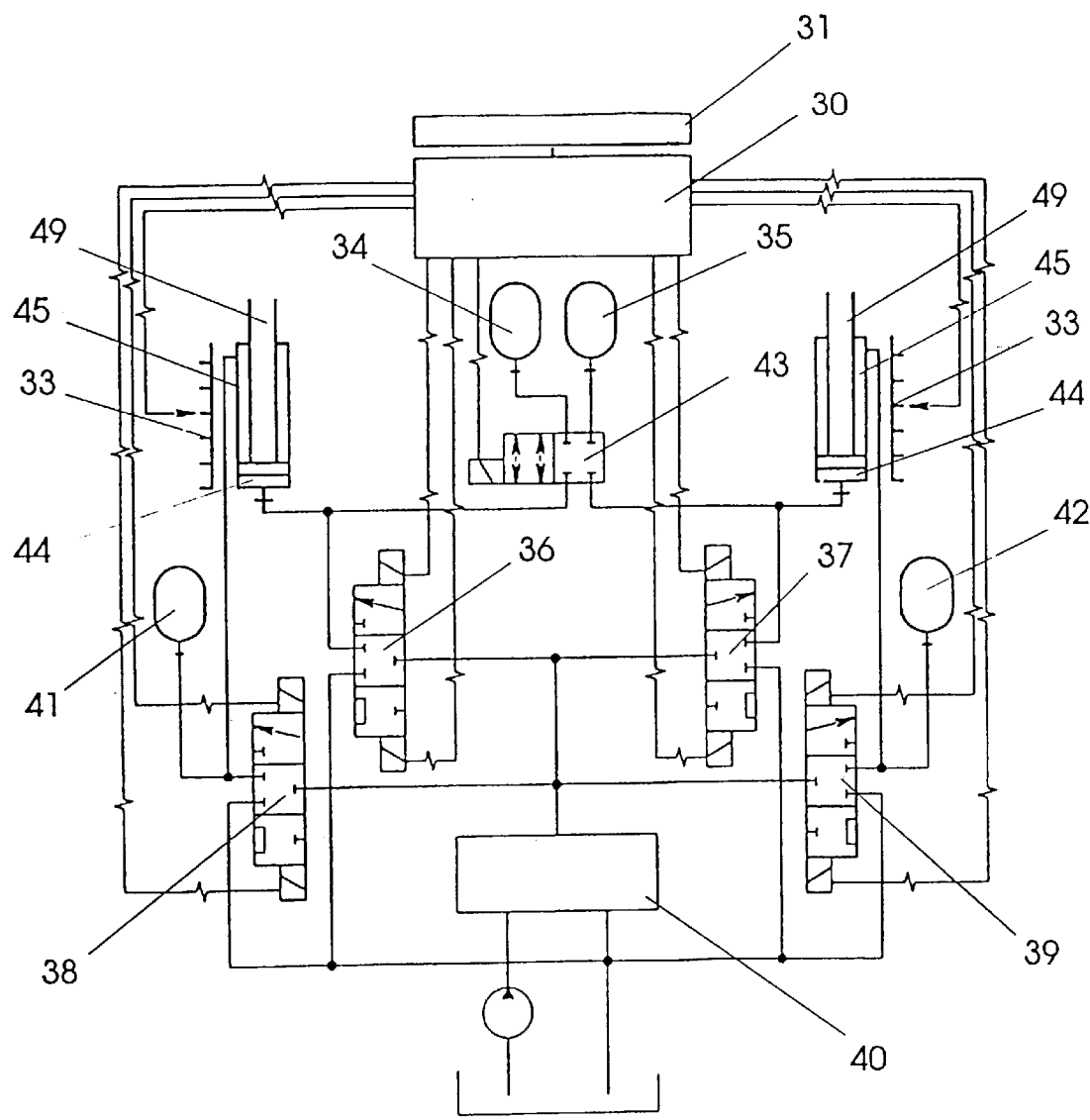
FIG. 5 is a diagrammatic view of a variant of FIG. 4 in which a further pressure storage device is associated with the piston rod pressure chambers of the hydraulic cylinder.

Another circuitry variant is shown in FIG. 5. Further pressure storage devices 41, 42 are directly connected to the pressure chambers 45 of the piston rod face, and by drivable directional control valves 38, 39 to the central hydraulics 40 and by the directional control valves 36, 37 to the pressure chambers 44 of the piston face. Here, by prestressing the storage devices 41, 42, first the starting point is an increase in the load states, and then the pressure in the storage devices 41, 42 is adjusted according to the load which actually occurred.

In this way the storage devices can be adapted to different load states which require different storage pressures, and the pistons 49 of the work cylinders 6, 11 and 23 can be set to the load-bearing middle position and kept in this middle position.

In case of operating states in which operation must be performed without inward deflection of the work piston 49, for example when working with a fixed front harvesting attachment, the pressure storage devices 34, 35 are shut off by the shut-off valve 43. Adjustment of the wheel carriage and front harvesting attachments 2, 9 and 15 takes place, as described above, by changes in the position of the work piston 49 of the work cylinders 6, 11 and 23 and is controlled by the electronic control system 30 by way of the nominal value entered in the strategy preselector 31.

Automatic regulation of the wheel carriage setting on the basis of the axle loads and operating states can also be completely switched off in order to make this adjustment by hand. This adjustment facility is advantageous particularly if, when working on slopes, the left and right wheel carriages are to be adjusted separately.

The foregoing embodiments are examples only and those skilled in the art may make changes or alterations without deviating from the spirit of the invention as defined by the scope of the claims.

I claim:

1. A device for adjustment and control of hydraulic cylinders of front work attachments and assemblies on work machines having central hydraulics, a hydraulic cylinder in the form of a double-acting work cylinder with a position and a single piston rod, the hydraulic cylinder having a piston rod pressure chamber and a piston face pressure chamber, a directional control valve operatively connected to the pressure chambers and the central hydraulics, a rechargeable pressure storage device, a shut-off valve associated with the pressure storage device, means for connecting the piston face pressure chamber and the pressure storage device in parallel, a hydraulic control circuit for driving the directional control valve and the shut-off valve, the hydraulic control circuit being operatively connected to a setpoint input, means for automatically making a line connection to a pressure line and a return line of the central hydraulics when pressure differs from predetermined nominal work pressure values, a position sensor operatively connected to the hydraulic cylinder for detecting the position of the piston, a switching valve selectively connecting the piston rod pressure chamber to the piston face pressure chamber the pressure storage device, and the central hydraulics; said piston rod pressure chamber also being connected via the directional control valve to the central hydraulics, an electronic control system for monitoring the position sensor, and means including the electronic control system and said switching valve for moving the piston via the piston rod pressure chamber in the case of low-load forces and via the piston face pressure chamber in the case of relatively higher load forces.

2. A device for adjustment and control of hydraulic cylinders of front work attachments and assemblies on work machines having means for providing central hydraulics; a hydraulic cylinder having a piston and a piston face pressure chamber; at least one directional control valve operatively connected to the piston face pressure chamber and the central hydraulics; at least one rechargeable pressure storage device: a shut-off valve associated with the pressure storage device; means for connecting the piston face pressure chamber and the pressure storage device in parallel; a hydraulic control circuit for driving each directional control valve and the shut-off valve; the hydraulic control circuit being connected to a setpoint input; means for automatically making a line connection to a pressure line and a return line of the central hydraulics when pressure differs from predetermined nominal work pressure values; a position sensor operatively connected to the hydraulic cylinder for detecting the position of the piston; the hydraulic cylinder being a double-acting work cylinder with a single piston rod; the hydraulic cylinder having a piston rod pressure chamber; a switching valve selectively connecting the piston rod pressure chamber to the piston face pressure chamber, the pressure storage devices, and the central hydraulics; said piston rod pressure chamber also being connected via said at least one directional control valve to the central hydraulics; an electronic control system for monitoring the position sensor; and means including the electronic control system and said switching valve for moving the piston via the piston rod pressure chamber in the case of low-load forces and via the piston face pressure chamber in the case of relatively higher load forces.

3. A device according to claim 2 wherein the piston rod pressure chamber of the work cylinders is directly connected in parallel with at least one additional pressure storage device and connected by at least one intermediate directional control valve to the central hydraulics of the harvesting machine and by at least one directional control valve to the piston face pressure chamber and to any of said pressure storage device.

4. A device according to claim 2 wherein directional control valves, the shut-off valve and the switching valves have adjusting members which are connected on the control side to the electronic control system of the harvesting machine; and including a preselection connected to the input of the electronic control system for setting a nominal work pressure value in the pressure chambers of the work cylinders.

* * * * *